United States Patent

Hutchinson

[11] Patent Number: 5,482,373
[45] Date of Patent: Jan. 9, 1996

[54] THERMOCHROMATIC INDICATOR FOR BEVERAGE CONTAINERS

[75] Inventor: Jill Hutchinson, Waterford, Mich.

[73] Assignee: Cool-Drink, Inc., Southfield, Mich.

[21] Appl. No.: 213,106

[22] Filed: Mar. 16, 1994

[51] Int. Cl.$^6$ .......................... G01K 1/14; G01K 11/12; G01K 13/12

[52] U.S. Cl. .......................... 374/141; 374/150; 374/162; 427/1

[58] Field of Search ........................ 374/150, 162, 374/141; 427/1

[56] References Cited

U.S. PATENT DOCUMENTS

| | | | |
|---|---|---|---|
| 2,799,167 | 7/1957 | Loconti | 374/162 |
| 3,540,629 | 11/1970 | Ballentine, Jr. | |
| 3,568,627 | 3/1971 | Selinger et al. | 116/216 |
| 3,633,425 | 1/1972 | Sanford | 374/162 |
| 3,704,625 | 12/1972 | Seto et al. | 374/162 |
| 3,864,976 | 2/1975 | Parker | 374/150 |
| 4,156,365 | 5/1979 | Heinmets et al. | 374/162 |
| 4,198,920 | 4/1980 | Russell | 116/216 |
| 4,464,064 | 8/1984 | D'Luzansky | 374/162 |
| 4,538,926 | 9/1985 | Chretien | 374/150 |
| 4,595,131 | 6/1986 | Ruskin et al. | |
| 4,859,360 | 8/1989 | Suzuki et al. | 374/162 |
| 4,878,588 | 11/1989 | Ephraim | 374/150 |
| 4,903,862 | 2/1990 | Shannon et al. | |
| 4,919,983 | 4/1990 | Fremin | 374/150 |
| 4,920,991 | 5/1990 | Shibahashi et al. | 128/736 |
| 4,931,420 | 6/1990 | Asano et al. | |
| 4,933,525 | 6/1990 | St. Phillips | 374/161 |
| 4,969,576 | 11/1990 | Merrill et al. | |
| 5,011,445 | 4/1991 | Nakasuji et al. | |
| 5,053,339 | 10/1991 | Patel | |
| 5,094,545 | 3/1992 | Larsson et al. | 374/162 |
| 5,282,683 | 2/1994 | Brett | 374/150 |
| 5,304,003 | 4/1994 | Winninger | 374/150 |

FOREIGN PATENT DOCUMENTS

| | | | |
|---|---|---|---|
| 0513071 | 5/1955 | Canada | 374/150 |
| 2426249 | 1/1980 | France | 374/150 |
| 2639101 | 3/1978 | Germany | 374/150 |
| 0011320 | 9/1887 | United Kingdom | 374/150 |
| 0024235 | 2/1909 | United Kingdom | 374/150 |

OTHER PUBLICATIONS

Figures 1–6 of Switzerland Patent No. 112492, published Nov. 1925 (only figures 1–6 considered).

*Primary Examiner*—Diego F. F. Gutierrez
*Attorney, Agent, or Firm*—Harness, Dickey & Pierce

[57] ABSTRACT

A temperature indicator system includes a temperature sensing assembly attachable to a beverage container. The temperature sensing assembly includes a temperature sensor in the form of a thermometer and a temperature scale against which the user may read the temperature of the contents of the beverage container. The sensing assembly may be provided on a beverage container from the point of sale in the retail store, or may itself be purchased and attached to a beverage container by means of either an adhesive backing or a magnetic strip. In one embodiment, the sensing assembly is fitted to a beverage container-encasing insulating sleeve. Optionally the temperature sensing assembly includes a region upon which the user of the beverage container may leave a personalizing mark, such as a pen marking or a fingerprint.

6 Claims, 1 Drawing Sheet

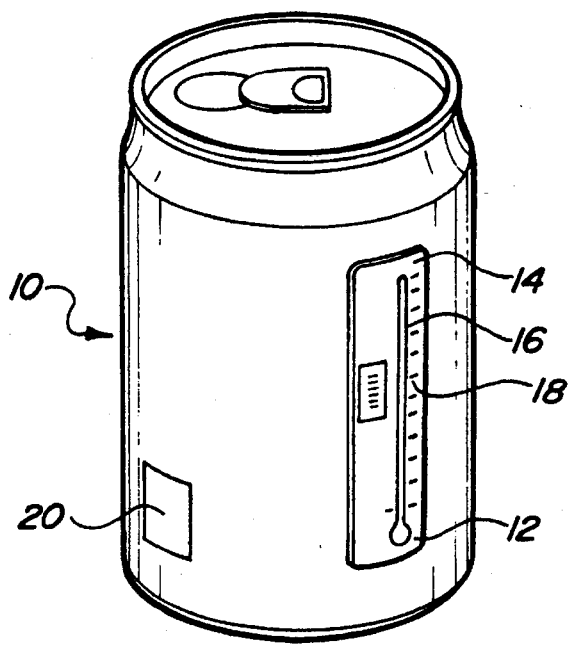
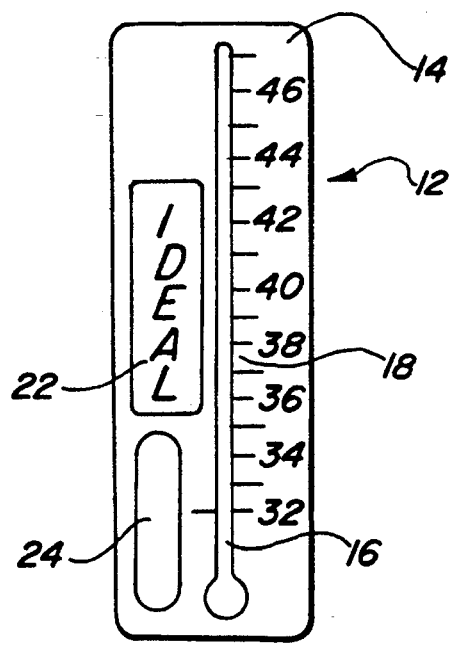
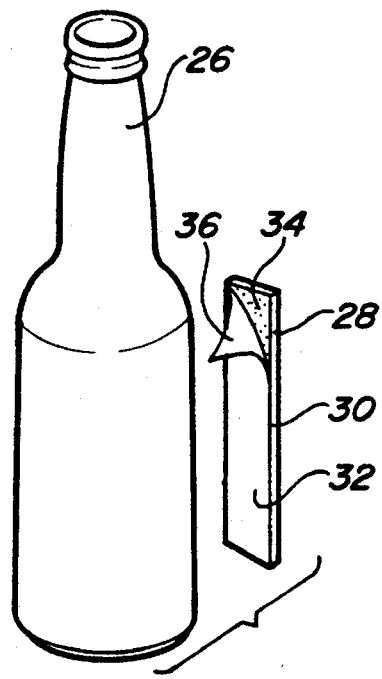
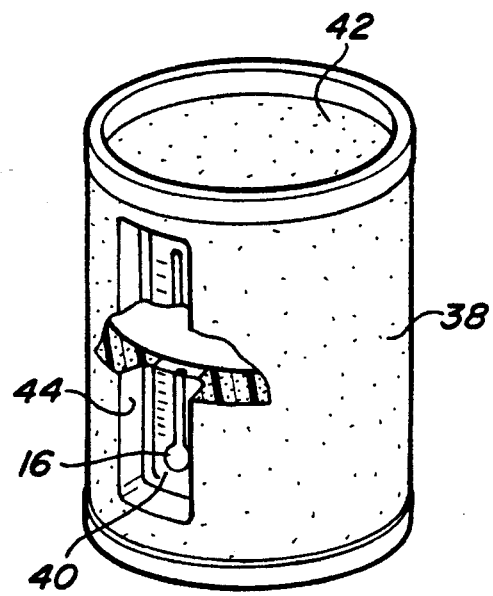

THERMOCHROMATIC INDICATOR FOR BEVERAGE CONTAINERS

BACKGROUND OF THE INVENTION

I. Field of the Invention

The present invention relates to a temperature indicator system for a beverage container. More particularly, the present invention relates to a temperature indicator system that is attachable to a beverage container for determining the temperature of the liquid contents of the container. The assembly includes a sensor body that may be composed of a magnetic material or that may have an adhesive backing, a thermometer, and a gauge against which the thermometer may be read. Optionally the assembly may be attached to an insulating sleeve into which the beverage container may be placed. In addition a place for personalizing the beverage container is optionally provided.

II. Description of the Relevant Art

Canned and bottled beverages include a wide array of flavors and types. This great variety includes canned and bottled pop and beer, juice, wine, wine coolers, and liquor. Business barometers report that canned and bottled beverages, particularly in the pop and wine cooler areas, are some of the fastest growing areas of the consumer market.

Concurrent with this accelerated interest in the beverage market is the development of consumers' demand for correctly cooled (or warmed, as the case may be) beverages. For example, few people like warm pop or warm beer (there are, however, many European societies that prefer the latter). Rather, consumers prefer cooled beverages.

However, present beverage containers offer no information to the consumer as to the temperature of the contained fluid. While the individual might sense the correct temperature by touching the container, this is an undesirable way of determining the preparedness of the contents to be imbibed. For example, what might seem the correct temperature for drinking to one person might be quite different from what another person considers to be correct. In fact, there might be quite a difference between the two extremes.

A similar problem arises with the wine collector. Fine wines need to be kept at certain desired temperatures. While wine cellars are commonly temperature controlled, this system is inexact as the temperature of a room may vary by several degrees from floor to ceiling.

A related problem that has arisen concurrent with the increased consumption of canned and bottled beverages is the problem of container identification. This problem has grown particularly in light of the quickly developing awareness that bacteria may be transmitted from the user of one container to the next by contact with the fluid contained within the container. For example, at a party or other celebration where pop and beer is consumed directly from the container, the consumer frequently confuses one pop can with another, thus causing the possible transmission of pathogens. To avoid this, many consumers simply start a fresh can or bottle, thus contributing to considerable waste of the product.

Accordingly, whether in the consumer market or in the wine cellar, there is wanting a system for determining the correct temperature of a beverage. Relatedly, there is also wanting a system of identifying a can or bottle.

SUMMARY OF THE PRESENT INVENTION

The temperature sensor and ownership identification system of the present invention overcomes the problems of incorrect temperature and misidentification.

The primary aspect of the present invention, the temperature indicator system, includes a temperature sensing assembly attachable to a beverage container. The temperature sensing assembly includes a temperature sensor in the form of a thermometer and a temperature scale against which the user may read the temperature of the contents of the beverage container. The gauge may indicate an "ideal" area to suggest to the user a desired temperature range.

The temperature indicator system may be provided on a beverage container by the bottler thus making it available to the consumer as a unified container-and-sensor package from the point of sale in the retail store. Alternatively, the system may itself be purchased as an "after market", all-flexible accessory for attachment to a beverage container by means of either an adhesive backing or a magnetic strip (the practicality of the latter, of course, depending on the type of metal used for packaging). In this form the temperature indicator system of the present invention may be reused.

As an alternative, the sensing assembly may be integrally mounted in a beverage container-encasing insulating sleeve. In this embodiment the back of the sensing assembly is provided so that when a beverage container is fitted within the insulator the back abuts the container and rests directly thereupon, thus conveying by convection an accurate reading of the fluid.

The present invention also provides a solution to the problem of identifying a container being used by the consumer. This solution includes an identification region upon which the user's personalizing mark may be applied. The region is located on either a remote region of the container (in the system packaged by the bottler), or may be provided on the body of the temperature sensing assembly.

The identification region may be made of a paper or a plastic-coated material that can be written upon. Alternatively, the region may be composed of a material sensitive to naturally-occurring body oil. According to this construction, the user may simply touch the region with a fingertip, and an identifying mark is left behind. Either way, this solution eliminates the possibility of confusing the opened container with another.

Other objects and details of the present invention will become more apparent from the following detailed description when read in conjunction with the accompanying drawings.

BRIEF DESCRIPTION OF THE DRAWINGS

The present invention will be more fully understood by reference to the following detailed description of the preferred embodiments of the present invention when read in conjunction with the accompanying drawings, in which like reference characters refer to like parts throughout the views, and in which:

FIG. 1 is a perspective view of the preferred embodiment of the present invention illustrating a beverage container with a temperature sensor assembly of the present invention mounted thereon;

FIG. 2 is a detailed plan view of the temperature sensor assembly of the present invention;

FIG. 3 is a perspective exploded view of a beverage container illustrating how the temperature sensor assembly may be attached thereto; and FIG. 4 is a perspective view in partial cross-section of an alternate embodiment of the system of the present invention illustrating an insulator with the temperature sensor assembly mounted therein.

DETAILED DESCRIPTION OF THE PREFERRED EMBODIMENTS OF THE PRESENT INVENTION

The drawings disclose the preferred embodiments of the present invention. While the configurations according to the illustrated embodiments are preferred it is envisioned that alternate configurations of the present invention may be adopted without deviating from the invention as portrayed. The preferred embodiments are discussed hereafter.

Referring to FIG. 1 a perspective view of the preferred embodiment of the present invention is shown illustrating a beverage container, generally illustrated as 10, with a temperature sensor assembly of the present invention, generally illustrated as 12, mounted thereon. In this embodiment the sensor assembly 12 is included by the bottler and hence is sold as part of the container package.

The illustrated can 10 is of the conventional stamped aluminum type. However, it must be understood that the sensor assembly 12 may be affixed to virtually any beverage container, including containers for pop, beer, juice, wine, wine coolers, and liquor.

The sensor assembly 12 includes a body 14, temperature sensor or a thermometer element 16 and an adjacent temperature scale 18. The thermometer element 16 is preferably of the known temperature-sensitive, thermochromatic type which is composed of a multi-layered sheet. Other types of thermometers may be used. The scale 18 may be read by reference to the mark indicated on the thermometer element 16.

Optionally provided on the container 10 is an identification region 20. The identification region 20 is provided for marking by the user of some identifying mark. The region 20 may be a paper or a plastic-coated material. Regardless of the composition, the material is of such construction so as to accommodate a mark from a pen or a pencil. The user may thus mark initials or some other identifying mark on the region 20.

As an alternative, the region 20 may include a surface of known material that is sensitive to the oils naturally occurring on the skin. In this manner, the user need only touch the mark (after removing a protective layer [not shown]) with a fingertip and the fingerprint of the user appears as an identifying mark.

Referring to FIG. 2, a detailed plan view of the temperature sensing assembly 12 shown and discussed above with respect to FIG. 1 is illustrated. The body 14 includes the thermometer element 16 and the scale 18. In addition, the body 14 has provided thereon an "ideal" range marker 22. Of course, this range may be adjusted up or down (from top end or the bottom) so as to accommodate a particular range as may be preferred thus accommodating different temperature needs for different beverages.

The body 14 may also include an identification region 24 that may be used as described above by marking or fingerprinting so as to identify the particular container as being that of a particular user.

Referring to FIG. 3, a perspective exploded view of a beverage container 26 and its accompanying, after-market type temperature sensing assembly 28 is illustrated. In this embodiment, the sensing assembly 28 may be purchased separately at a liquor store or in the pop and beer section of a grocery store. The sensing assembly 28 includes a front side 30 (not shown) and a back side 32. The front side 30 is preferably identical in composition and appearance to the sensing assembly 12 illustrated and discussed above with respect to FIG. 2.

The embodiment of FIG. 3 is preferably different from that of FIG. 2, however, in that it may be attached to the container 26 by the user. To allow this, an adhesive strip (or a magnetic sheet) 34 is provided To protect the strip until such time as the user has purchased the assembly 28, a removable protective backing 36 is provided. The assembly 28 is composed of flexible components to provide for versatility. Preferably, although not necessarily, the assembly 28 may be readily removed from the container 26 for reattachment to another container or for cleaning the container 26 for recycling.

Referring to FIG. 4, a perspective view of a partial cross-section of an alternative embodiment of the system of the present invention is shown and includes an insulating body 38 and a temperature sensing assembly 40. The temperature sensing assembly 40 is substantially the same as that shown in FIG. 2 and discussed in conjunction therewith.

The insulating body 38 includes a container-receiving well 42. The well 42 is of such diameter and dimension so as to snugly accommodate a selected beverage container such as a beer or pop can. The insulating body 38 may be composed of any foamed or expanded polymerized material that is flexible yet has good insulating qualities.

As may be seen, the assembly 40 is provided in a recessed region 44. This construction allows the back of the assembly 40 to be adjacent to the can contained within the insulating body 38. The back of the assembly 40 is allowed to rest directly against the container itself (not shown), thereby allowing the temperature of the contained fluid to be accurately communicated to the thermometer element 16.

The invention being thus described, it will be obvious that the same may be varied in many ways. Such variations are not regarded as a departure from the spirit and scope of the invention, and all such modifications are intended to be included within the scope of the following claims.

What is claimed is:

1. A temperature indicator system for a beverage container, said system comprising:

a temperature sensing assembly, said temperature sensing assembly being attachable to a beverage container, said temperature sensing assembly including a body, said body including a front side and a back side;

an adhesive material, said adhesive material including a front side and a back side, said back side of said adhesive material being fitted to said back side of said body of said assembly;

a removable protective backing, said removable protective backing being removably fitted to said front side of said adhesive material;

a temperature sensor, said temperature sensor being fitted to said front side of said body of said temperature sensing assembly;

a temperature scale, said temperature scale being mounted on said front side of said body of said temperature sensing assembly in close relation to said temperature sensor, whereby the temperature of the beverage contained within said beverage container sensed by said temperature sensor may be read by comparison with said temperature scale;

a region for applying and recording a fingerprint, said region being formed on said body; and said body, said temperature sensor, and said temperature scale being composed of flexible components.

2. A temperature indicator system for a beverage container, said system comprising:

a beverage container;

a temperature sensor assembly attached to said beverage container for measuring and indicating the temperature of the fluid contained within said beverage container;

said temperature sensing assembly including a body, said body including a front side and a back side;

an adhesive material, said adhesive material including a front side and a back side, said back side of said adhesive material being fitted to said back side of said body of said assembly, said front side of said adhesive material being permanently attached to said beverage container;

a temperature sensor, said temperature sensor being fitted to said front side of said body of said temperature sensing assembly;

a temperature scale, said temperature scale being mounted on said front side of said body of said temperature sensing assembly in close relation to said temperature sensor, whereby the temperature of the beverage contained within said beverage container sensed by said temperature sensor may be read by comparison with said temperature scale;

a region for applying and recording a fingerprint, said region being formed on said body; and said body, said temperature sensor, and said temperature scale being composed of flexible components.

3. The temperature indicator system of claim 2, wherein said temperature scale includes increments for reading the temperature indicated by said thermometer.

4. The temperature indicator system of claim 3 wherein said temperature scale includes markings to indicate an ideal range.

5. The temperature indicator system of claim 2 wherein said sensor body is composed of a magnetic material.

6. The temperature indicator system of claim 2 wherein said adhesive material is reusable.

* * * * *